(12) United States Patent
Haines et al.

(10) Patent No.: US 12,672,212 B2

(45) Date of Patent: Jun. 30, 2026

(54) ELECTRICAL WIRING DEVICE FOR PROVIDING VARIABLE POWER

(71) Applicant: Pass & Seymour, Inc., Syracuse, NY (US)

(72) Inventors: Joshua Haines, Marcellus, NY (US); Richard Rohmer, Memphis, NY (US); Yianni Kostaris, Syracuse, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 256 days.

(21) Appl. No.: 18/604,987

(22) Filed: Mar. 14, 2024

(65) Prior Publication Data

US 2025/0142695 A1 May 1, 2025

Related U.S. Application Data

(60) Provisional application No. 63/512,203, filed on Jul. 6, 2023, provisional application No. 63/452,093, filed on Mar. 14, 2023.

(51) Int. Cl.

| | |
|---|---|
| *H05B 45/18* | (2020.01) |
| *H02M 7/06* | (2006.01) |
| *H05B 45/37* | (2020.01) |

(52) U.S. Cl.
CPC .............. *H05B 45/18* (2020.01); *H02M 7/06* (2013.01); *H05B 45/37* (2020.01)

(58) Field of Classification Search
CPC ......... H05B 45/18; H05B 45/37; H02M 7/06; H02M 1/083; H02M 1/327; H02M 7/003
See application file for complete search history.

(56) References Cited

U.S. PATENT DOCUMENTS

| | | | | |
|---|---|---|---|---|
| 8,829,949 | B2 * | 9/2014 | Zajc | H03K 4/64 |
| | | | | 327/109 |
| 8,963,535 | B1 * | 2/2015 | Melanson | H03K 17/90 |
| | | | | 324/252 |
| 9,155,174 | B2 * | 10/2015 | Draper | H05B 41/3924 |
| 9,791,871 | B1 * | 10/2017 | Marschalkowski | |
| | | | | G05D 23/1902 |
| 9,961,727 | B2 * | 5/2018 | Vanderzon | H05B 45/10 |
| 10,390,392 | B2 | 8/2019 | Polzer | |
| 10,405,392 | B1 * | 9/2019 | Shi | H05B 45/3575 |
| 10,517,164 | B1 * | 12/2019 | Charles | H02M 1/083 |
| 10,863,601 | B2 * | 12/2020 | Chen | H05B 45/3575 |
| 11,233,449 | B2 * | 1/2022 | Song | H02M 1/12 |

(Continued)

FOREIGN PATENT DOCUMENTS

| | | | | |
|---|---|---|---|---|
| EP | 2782238 | A2 * | 9/2014 | H05B 45/10 |
| EP | 3557950 | B1 * | 10/2020 | H05B 45/56 |

(Continued)

*Primary Examiner* — Adam D Houston

(74) *Attorney, Agent, or Firm* — Bond, Schoeneck & King, PLLC; Jonathan L. Gray

(57) ABSTRACT

A power control device for providing variable power to a load. The power control device including a single FET employed in conjunction with a bridge rectifier to reverse bias the body diode of the FET except for when a sufficient voltage is provided to the gate of the FET. A temperature compensation circuit reduces the on-time of the bridge rectifier when a thermally sensitive component indicates that the temperature of the bridge rectifier has exceeded a threshold.

20 Claims, 13 Drawing Sheets

(56)     References Cited

U.S. PATENT DOCUMENTS

| | | | | |
|---|---|---|---|---|
| 2011/0148505 A1* | 6/2011 | Klapatch | ............... | H02M 5/293 |
| | | | | 327/434 |
| 2011/0175532 A1* | 7/2011 | Peng | ..................... | H05B 45/18 |
| | | | | 315/276 |
| 2016/0066386 A1* | 3/2016 | Catalano | ................ | H05B 45/56 |
| | | | | 315/309 |
| 2016/0157319 A1* | 6/2016 | Yadav | .................... | H05B 45/46 |
| | | | | 315/297 |
| 2016/0174318 A1* | 6/2016 | Mignano | ................ | H05B 45/50 |
| | | | | 315/201 |
| 2017/0294831 A1* | 10/2017 | Dai | ........................... | G05F 5/00 |
| 2017/0374718 A1* | 12/2017 | Fang | ..................... | H05B 47/19 |
| 2018/0154784 A1* | 6/2018 | Xu | .......................... | H02M 1/08 |
| 2018/0213621 A1* | 7/2018 | Freer | ..................... | H05B 45/10 |
| 2020/0271279 A1* | 8/2020 | Xiong | ................... | F21V 23/005 |
| 2020/0366188 A1* | 11/2020 | Bollinger | .......... | H05B 41/3924 |
| 2022/0385169 A1* | 12/2022 | Ghorband | .............. | H02M 1/32 |
| 2023/0138627 A1* | 5/2023 | Nandi | ...................... | H02J 7/68 |
| | | | | 361/78 |
| 2023/0344341 A1* | 10/2023 | Liu | ......................... | H02M 1/36 |
| 2025/0142695 A1* | 5/2025 | Haines | .................. | H05B 45/18 |
| 2025/0219434 A1* | 7/2025 | Yang | ..................... | H02J 7/855 |
| 2025/0279646 A1* | 9/2025 | Hausman, Jr. | ....... | H05B 45/315 |
| 2025/0374400 A1* | 12/2025 | Lewis | ................. | H02M 1/081 |
| 2025/0379526 A1* | 12/2025 | Wu | ........................ | H02M 1/32 |

FOREIGN PATENT DOCUMENTS

| | | | | | |
|---|---|---|---|---|---|
| FR | 3115419 | A1 * | 4/2022 | ......... | H05B 45/3575 |
| JP | 2018142551 | A * | 9/2018 | | |
| KR | 20250013284 | A * | 1/2025 | ........... | H02M 3/156 |
| WO | WO-2012130479 | A2 * | 10/2012 | ........... | H02M 7/219 |

\* cited by examiner

500

RHCL453P (existing design)

| ① | | paddle 526 |
| ② | | actuator 524 |
| ③ | | trim ring 528 |
| ④ | | slide knob 530 |
| ⑤ | x2 | assembly screw 520 |
| ⑥ | | stem coupler 532 |
| ⑦ | x4 | rivet 508 |
| ⑧ | | aluminum heat sink 506 |
| ⑨ | | separator 504 |
| ⑩ | | terminal 512 |
| ⑪ | | terminal, 3-way 514 |
| ⑫ | | light pipe 538 |
| ⑬ | | moveable 536 |
| ⑭ | x2 | contact spring |
| ⑮ | | pivot 538 |
| ⑯ | | terminal common 516 |
| ⑰ | | terminal ground 518 |
| ⑱ | | back body 502 |

510

534

600

RHL153P (new design)

| | |
|---|---|
| 1 | paddle 604 |
| 2 | x4 assembly screw |
| 3 | steel strap 626 |
| 4 | trim ring, cover, separator 606 |
| 5 | slide knob 608 |
| 6 | ground wire 628 |
| 7 | moveable 616 |
| 8 | pivot 618 |
| 9 | terminal 620 |
| 10 | terminal, 3-way 622 |
| 11 | terminal common 624 |
| 12 | back body 602 |

614

610

612

700

702 — RECEIVE A SIGNAL REPRESENTATIVE OF AN ELECTRICAL CHARACTERISTIC OF A THERMALLY SENSITIVE COMPONENT INDICATING THE TEMPERATURE OF A BRIDGE RECTIFIER

704 — DOES TEMPERATURE EXCEED THRESHOLD?

NO

YES

706 — REDUCE ON TIME OF FIELD-EFFECT TRANSISTOR

STEP 708

ELECTRICAL WIRING DEVICE FOR PROVIDING VARIABLE POWER

CROSS REFERENCE TO RELATED APPLICATIONS

This application claims priority to and the benefit of U.S. Provisional Patent Application No. 63/512,203, filed on Jul. 6, 2023, and of U.S. Provisional Patent Application No. 63/452,093, filed on Mar. 14, 2023, each of which is hereby incorporated by reference herein in its respective entirety.

FIELD OF THE INVENTION

This invention generally relates to electrical wiring devices for providing variable power, and, specifically, to power control devices such as dimmer devices that use a single FET to control the power to the load.

BACKGROUND OF THE INVENTION

Conventional dimmers, such as those historically used with incandescent bulbs, rely on a solid-state switching device such as a TRIAC or silicon-controlled rectifier (SCR), to "cut off" a portion of each half cycle delivered to the load—the percentage of the half-cycle cut off dictating the relative perceived brightness of the load. More recently, MOSFETs have been favored over TRIACs or SCRs. But FETs themselves have a drawback, namely, that even where a voltage is not provided to the gate, the FET will still permit current flow in one direction by virtue of a "body diode" inherent to the FET. The current permitted by this body diode can be addressed by placing two FETs in series, each FET being reverse biased with respect to the other. An example of this is, shown, for example, in FIG. 6 of U.S. Pat. No. 9,419,435, titled "Universal power control device," assigned to Pass & Seymour, Inc. and incorporated herein by reference in its entirety. The redundancy of two FETs, however, introduces additional cost to the manufacture of the dimmers.

BRIEF SUMMARY OF THE INVENTION

According to an aspect, a dimmer device with temperature compensation, includes: a housing assembly including a line terminal configured to be attached to a mains input, and a load terminal configured to be attached to a load; a bridge rectifier, including a first input terminal and a second input terminal and a first output terminal and a second output terminal, wherein the first input terminal is electrically connected to the line terminal and the second input terminal is electrically connected to the load terminal; a field-effect transistor having a body diode, the field-effect transistor being connected between the first output terminal and the second output terminal such that the body diode blocks current between the first output terminal and the second output terminal except for when a sufficient voltage is applied to a gate of the field-effect transistor, wherein blocking current between the first output terminal and the second output terminal interrupts current to the load terminal; a thermally sensitive component disposed such that an electrical characteristic of the thermally sensitive component is representative of a temperature of the bridge rectifier; at least one variable control mechanism coupled to the housing assembly, the at least one variable control mechanism being configured to adjustably select a user adjustable load setting, the user adjustable load setting being adjustable between a minimum setting and a maximum setting; and a controller configured to apply a voltage to the gate of the field-effect transistor such that the field-effect transistor is on for an on-time occurring during at least a portion of each half cycle of the mains input, wherein the controller is configured to adjust the on-time of the field-effect transistor based, at least in part, on the user adjustable load setting, wherein the controller is further configured to reduce the on-time of the field-effect transistor when the electrical characteristic of the thermally sensitive component indicates that the temperature of the bridge rectifier exceeds a threshold.

According to an example, the thermally sensitive component is a diode.

According to an example, the thermally sensitive component is a thermistor.

According to an example, the on-time of the field-effect transistor is reduced according to a look up table that correlates a value of the electrical characteristic of the thermally sensitive component to an on-time of the field-effect transistor.

According to an example, the on-time of the field-effect transistor is further reduced each instance the electrical characteristics of the thermally sensitive component indicates that the temperature of the bridge rectifier exceeds the threshold.

According to an example, after reducing the on-time when the electrical characteristic of the thermally sensitive component indicates that the temperature of the bridge rectifier exceeds the threshold, the on-time can be increased upon determining that the electrical characteristic of the thermally sensitive component indicates that the temperature of the bridge rectifier does not exceed the threshold.

According to an example, the on-time is reduced at a first rate, wherein the on-time is increased at a second rate, wherein the first rate is higher than the second rate.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Applicant has recognized that a full-wave bridge rectifier, though using four diodes, is cheaper than using two MOS-FETs and can be leveraged to direct current to a single MOSFET in a manner that reverse biases the body diode of the MOSFET during each half cycle.

US 12,672,212 B2

3

Figure 1A:
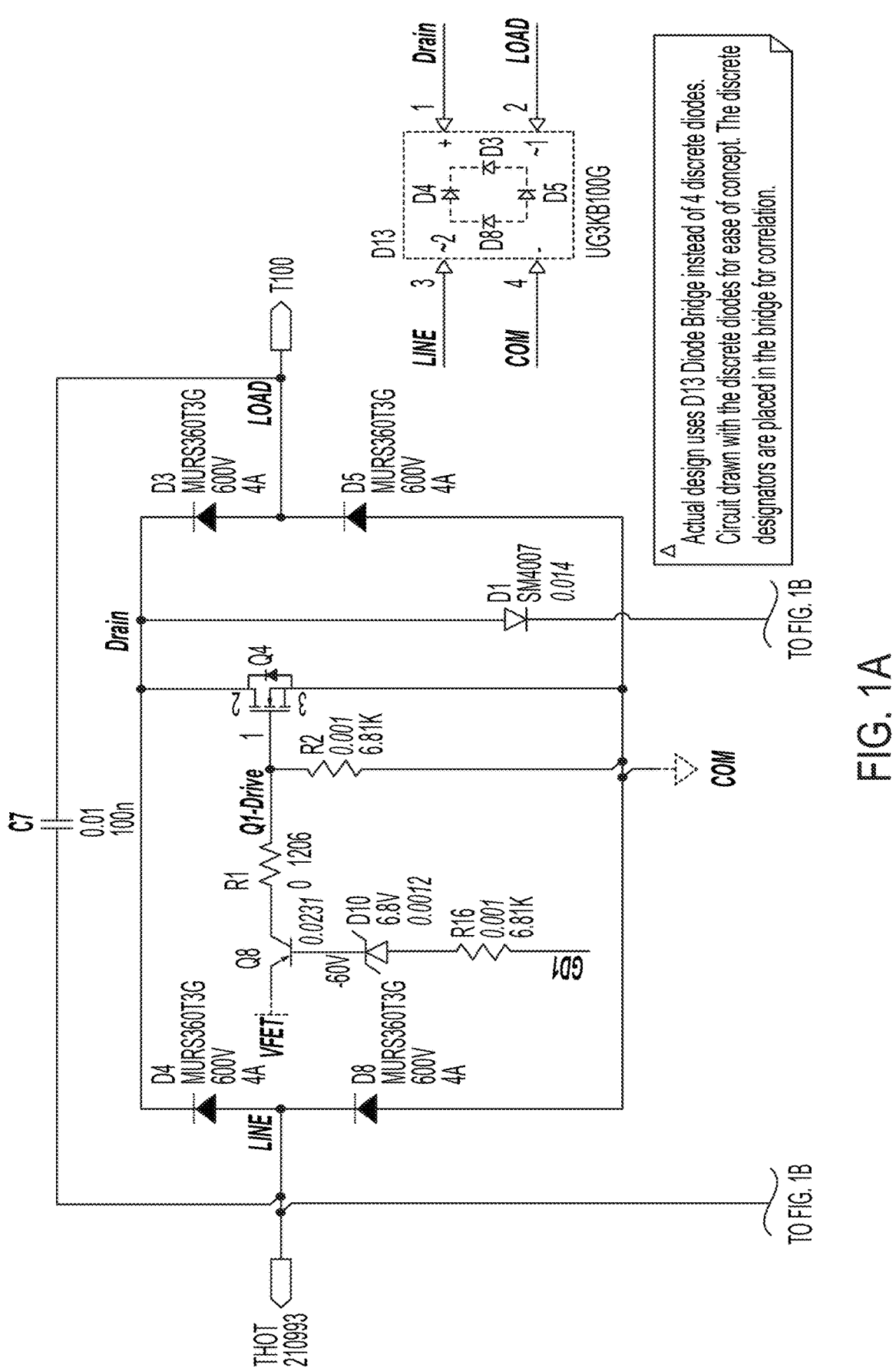
FIGS. 1A-1B depict a schematic of a single-FET dimmer, according to an example.
Figure 1B:
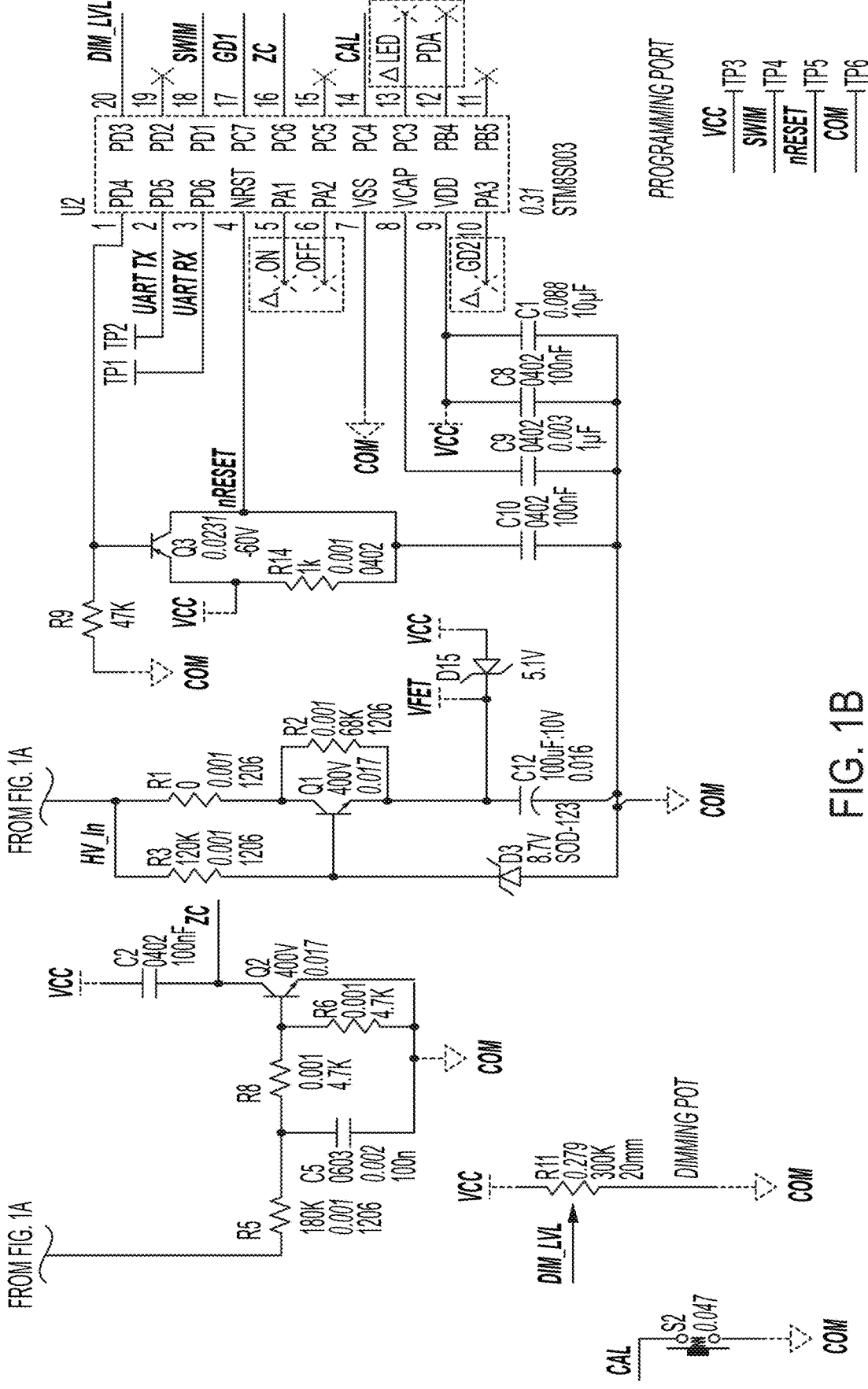

An example of this is shown in the dimmer schematic of FIG. 1, where MOSFET Q4 is disposed in the full-wave bridge rectifier comprised of diodes D3, D4, D5, and D8. During operation, current will flow through diodes D4 and D5 during the positive half cycle and diodes D8 and D3 during the negative half cycle. In both instances, the current flows through the drain to the source of the MOSFET Q4, i.e., in a direction that reverse biases the body diode. Accordingly, MOSFET Q4 blocks the flow of current, by virtue of the reverse-biased body diode, except for when a sufficient voltage is applied to the gate (i.e., a gate voltage exceeding the gate threshold is applied). In this manner, the circuit of FIG. 1 can be utilized in a two-wire dimmer circuit that accepts a HOT input and outputs a phase-cut HOT voltage to a load.

Figure 2A:
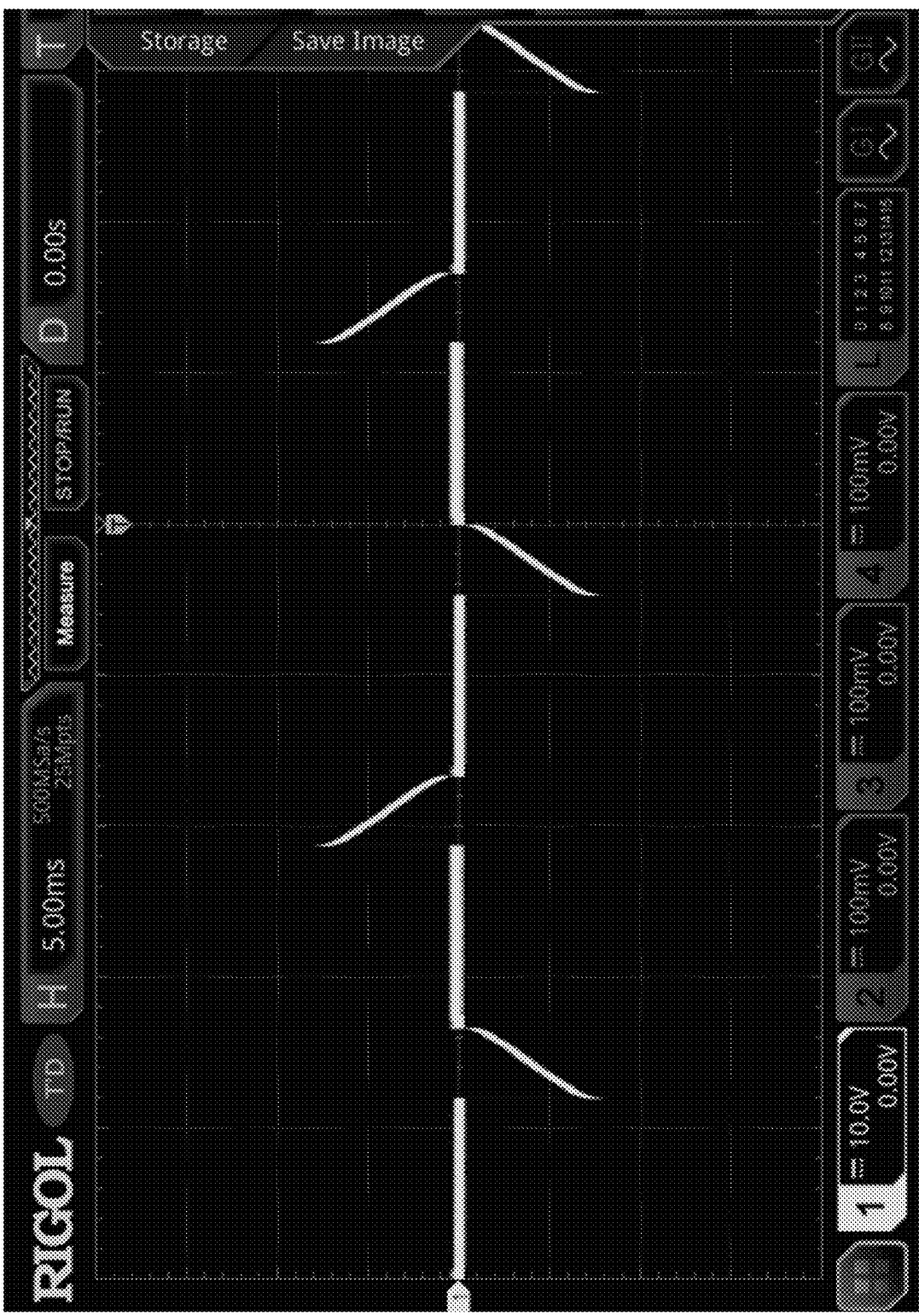
FIGS. 2A-2C depict the voltage at the load terminal T100 at various dim states, according to an example.
Figure 2B:
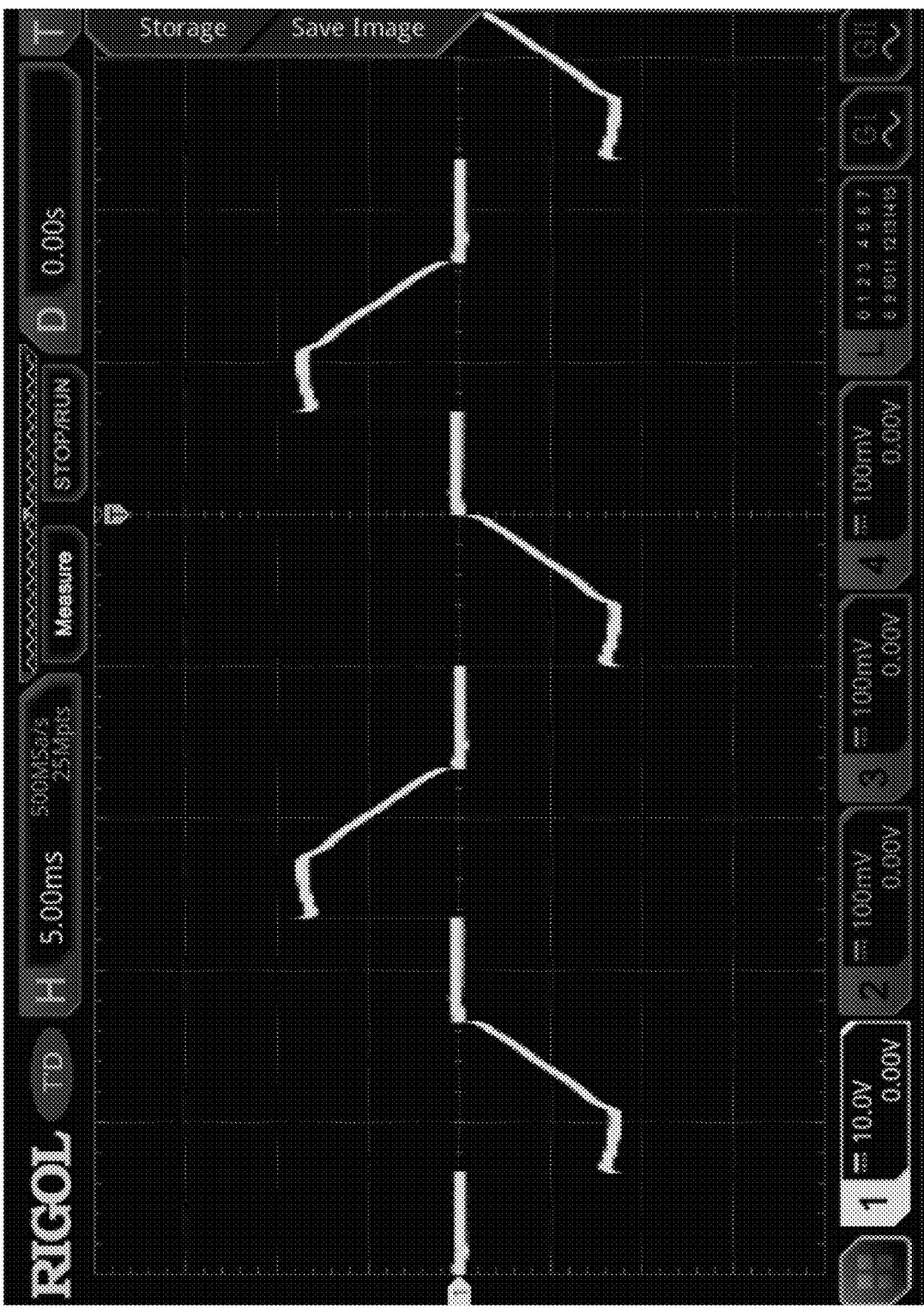
Figure 2C:
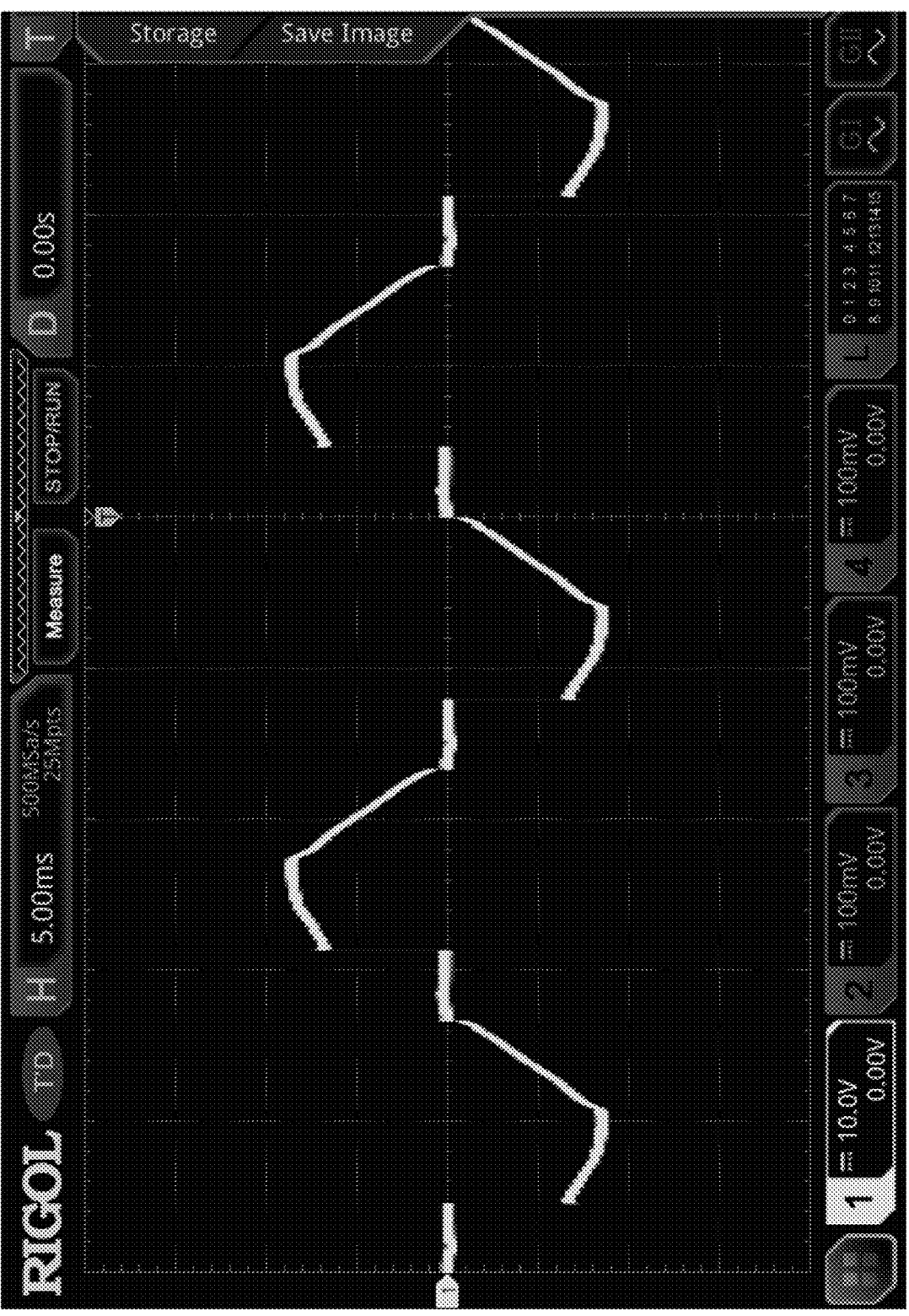

Notably, while MOSFET Q4 receives the rectified current, the output to the load is not rectified. Stated differently, MOSFET Q4 is attached to the output terminals of the rectifier—which is also represented in FIG. 1 as bridge rectifier D13—while THOT and T100 form the input to the bridge rectifier. As a result, while the MOSFET Q4 "sees" the rectified current, the output to the load does not. FIGS. 2A-2C depict the T100 output voltage in various dim states. Specifically, FIGS. 2A-2C depict, in order, increasing duty cycles of the dimmed output signal.

The gate voltage VFET is provided to MOSFET Q4 when controller U2 driver BJT Q8 into conduction with output GD1. Controller U2 can deliver output GD1 in any suitable fashion for dimming the load, including leading edge (such as shown in FIGS. 2A-2C) and trailing edge dimming methods. It should be understood that further modifications to the circuit may be required to support a leading-edge dimming method, such as including an additional neutral connection. Such modifications would be understood by a person of ordinary skill in the art.

The dimming method—leading-edge, trailing edge, or otherwise—can be keyed to the zero-cross of the mains voltage, which can be detected through operation of BJT Q2. Resistor R5 and capacitor C5 function as a low-pass filter to isolate the 60 Hz signal from any high frequency noise that could interfere with the zero-cross detection. During operation, capacitor C5 will charge until the voltage, as conditioned by the voltage divider comprises resistors R6 and R8, drives BJT Q2 into conduction. BJT Q2, beginning to conduct, brings ZC low, as VCC drops entirely across the parallel combination of resistor R4 and capacitor C2. At the end of the positive half cycle, capacitor C5 will begin to discharge, resulting in BJT Q2 ceasing to conduct, meaning that ZC will go high—i.e., to the value of VCC. Accordingly, the zero cross ZC signal will be a square wave that is driven high and low, each change from high to low, or low to high, representing a zero cross, albeit with some constant phase shift (that can be accounted for in later processing, e.g., by the firmware of controller U2).

In this example, controller U2 is powered by the voltage VCC, which itself is derived from the mains voltage. More particularly, voltage VCC is the stepped down VFET voltage, formed across capacitor C12. Capacitor C12 is charged at the start of the positive half cycle when BJT Q1 is turned on by the mains voltage. More particularly, at the start of the positive half cycle, current will flow through diode D1 and resistor R3 to quickly drive BJT Q1 into conduction (this example assumes a leading-edge dimming pattern), providing a nearly direct connection to the mains voltage for capacitor C12. This will continue until Zener diode D3 enters breakdown (here, at 8.7 V, although this value is a design choice), after which C12 continues to charge, albeit more slowly, via the current flow through resistor R2. The voltage across C12 is employed as the voltage that is selectively applied to the gate of MOSFET Q4, according to gate drive signal GD1. The VFET voltage is stepped down using the Zener diode D15 to result in VCC that powers controller U2. (While this example assumes a leading-edge dimming pattern, it can, in other examples, be modified to operate with a trailing-edge dimming pattern.)

Although controller U2 is shown as a single microcontroller, it should be understood that, in alternative examples, controller U2 can be implemented by multiple microcontrollers working in concert, together with any associated hardware necessary for operation.

The dimmer can utilize any suitable user interface, including a dimming pot (as shown in FIG. 1), touch sensor, IR sensor, etc., to receive an input from a user. This input can be interpreted by controller U2, which can, accordingly, drive MOSFET Q4 according to a predetermined dimming response curve. Because the input from the user interface (e.g., the dimming pot R11) is interpreted by controller U2, the dimming response curve need not be linear. For example, controller U2 can be programmed to implement minimum or maximum values other than what the interface, such as the dimming pot, would normally permit. Other dimming curves can, for example, account for the non-linear perception of brightness by the human eye so that dimming appears linear. Additional suitable dimming curves are contemplated.

Figure 4A:
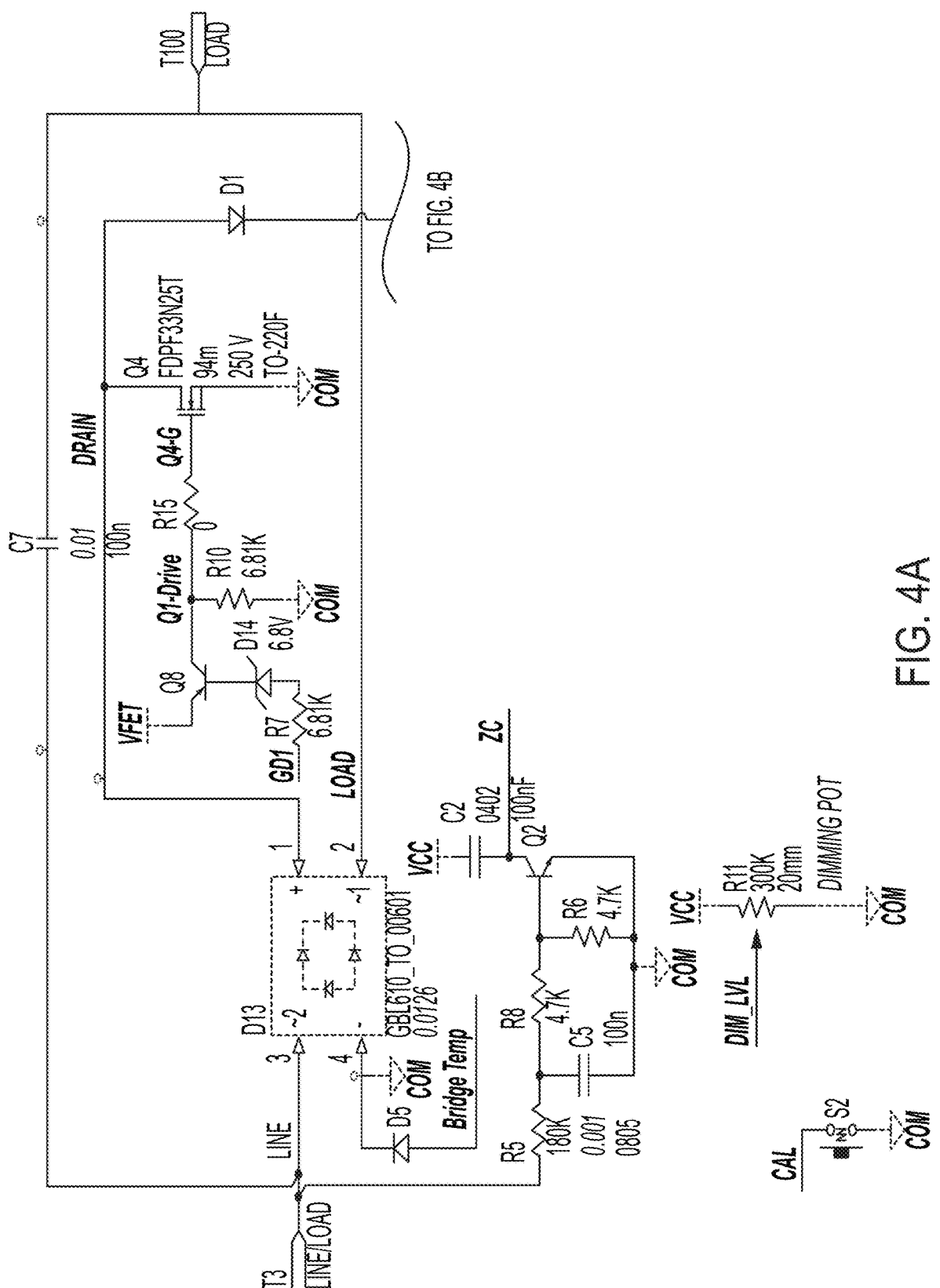
FIGS. 4A-4B depict a schematic of a single-FET dimmer with temperature compensation, according to an example.
Figure 4B:
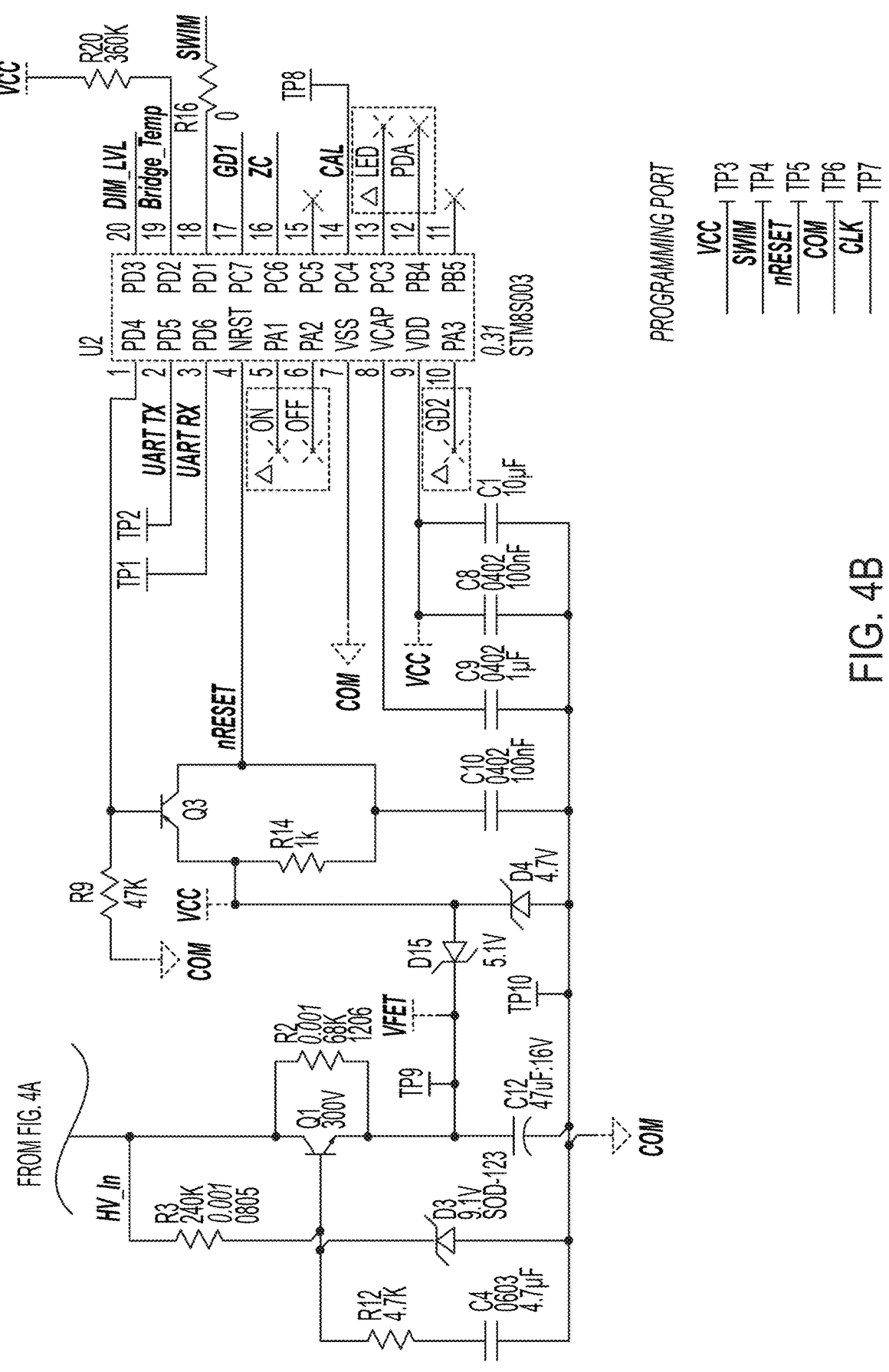

The values of the components selected for the dimmer shown in FIGS. 1 and 4 can account for the power consumption of the load. Thus, if the load is an LED or incandescent, and thus relatively low power, cost effective values of the components can be selected to provide power to those low power loads, without the need to employ higher cost components capable of providing power to higher power loads.

FIG. 1 depicts the full-wave bridge rectifier as four separate discrete diodes. Typically, however, a discrete diode bridge, rather than the discrete diodes, would be used to reduce the cost of the device. An example of FIG. 1 using the discrete diode bridge, rather than the discrete diodes is shown in FIG. 3.

Figure 3A:
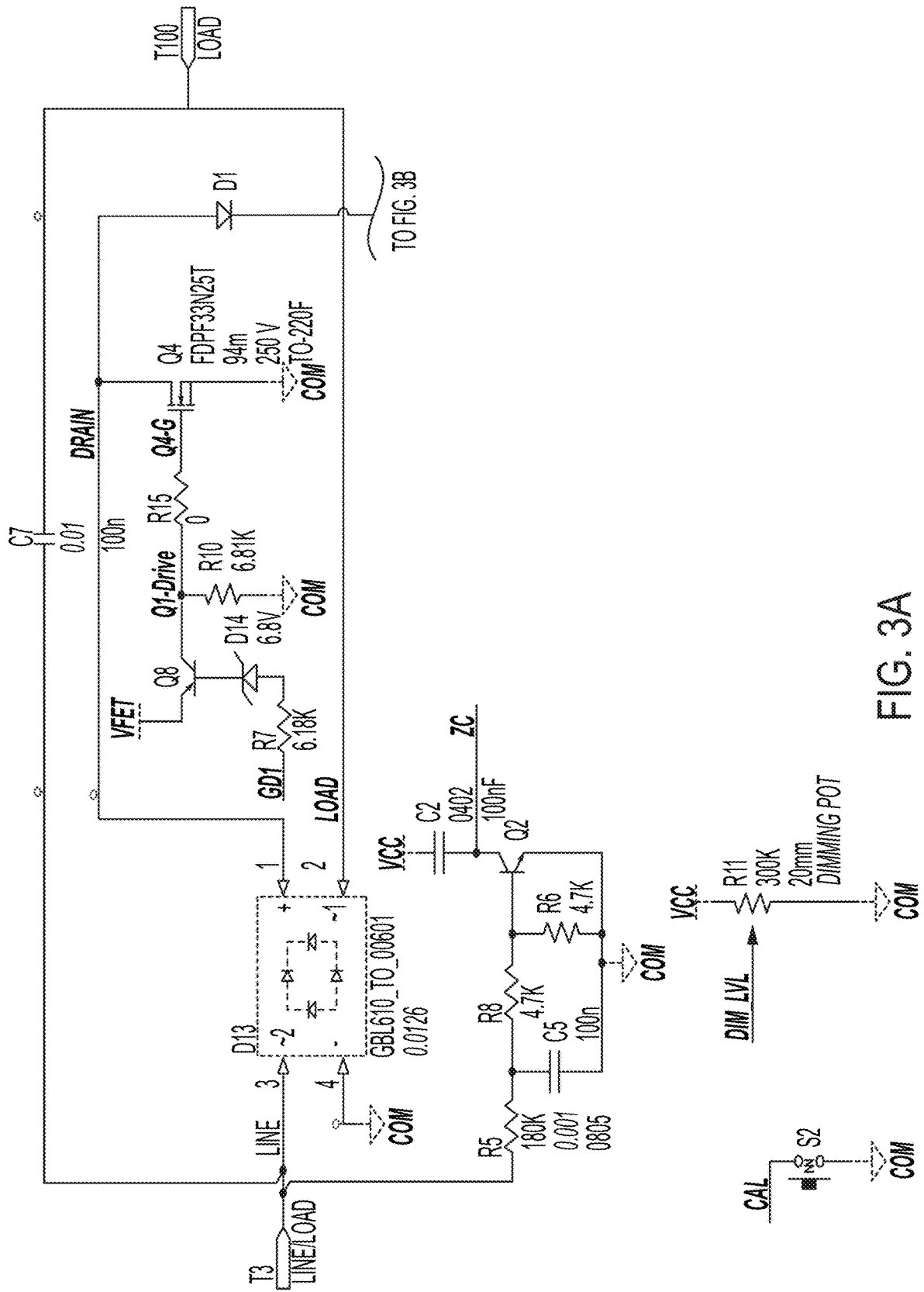
FIGS. 3A-3B depict a schematic of a single-FET dimmer, according to an example.
Figure 3B:
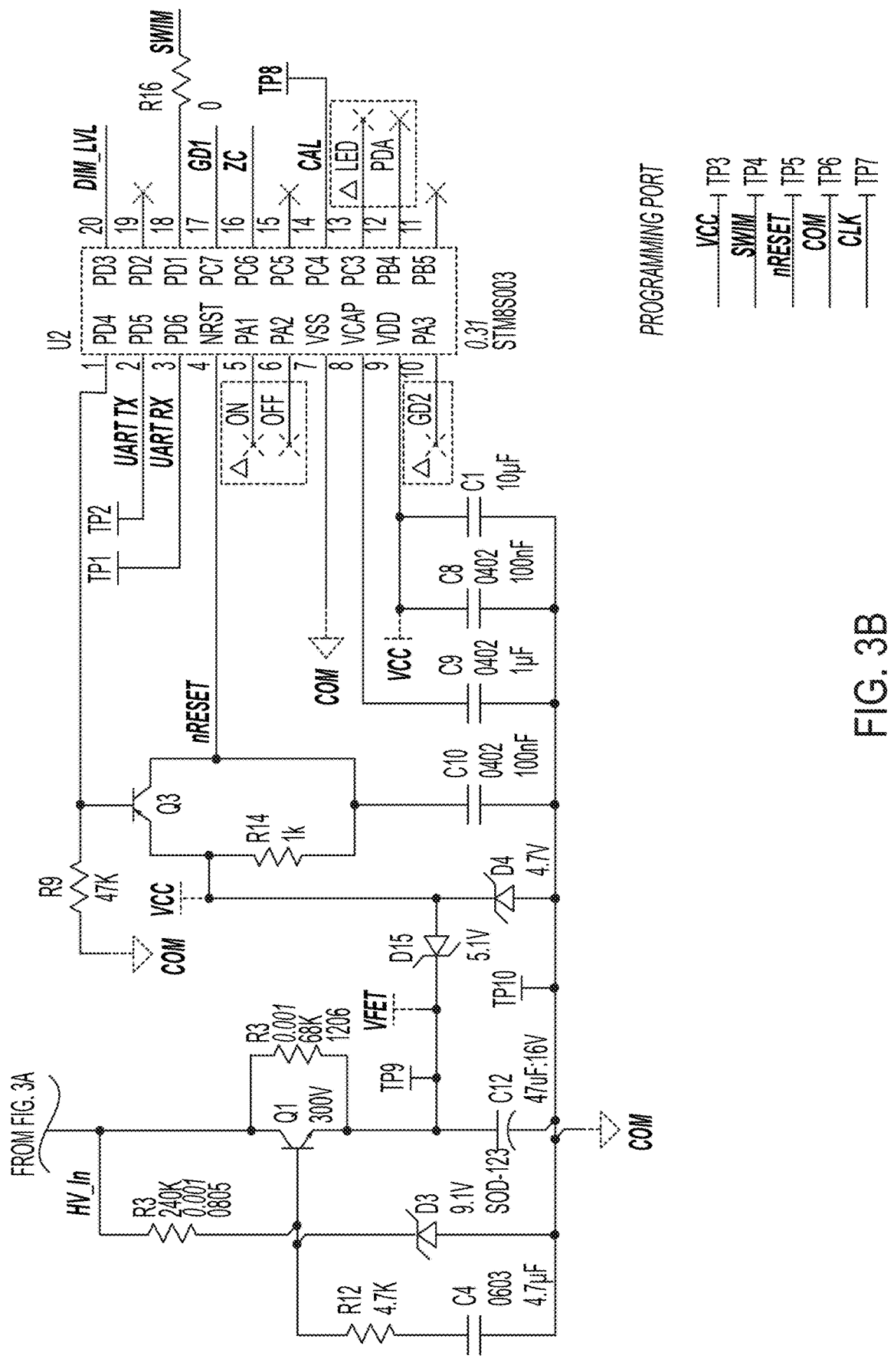

FIG. 4 depicts the circuit of FIG. 3 with the addition of a heat detection circuit, comprising diode D5 and pull-up resistor R20. During operation, bridge rectifier generates the greatest amount of heat and thus represents a likely point of failure should the dimmer be connected to a load drawing power at a value greater than the power rating of the circuit (e.g., if the dimmer is rated to 150 W, a connection to a 300 W load would likely cause the bridge rectifier D13 to overheat). To address this, controller U2 is configured to detect the temperature of the bridge rectifier as a voltage value output by heat detection circuit and adjusts the duty cycle (by shortening on-time of switch Q4 during each half-cycle) to reduce the power delivered to the load, if the heat detected exceeds a threshold.

As the heat rises, or fails to fall the below the threshold, the duty cycle can be further adjusted (i.e., further shortening on-time of switch Q4 during each half cycle) to reduce the power delivered and, as a result, to reduce the temperature of bridge circuit D13 and the dimmer. In an example, the voltage value output by the heat detection circuit can be input to a look-up table, implemented by controller U2, equating voltage values (representative of temperature) to duty cycle values. Alternatively, the duty cycle can be reduced (e.g., by a predetermined value) each sample (or other predetermined interval) that the temperature does not fall below the threshold value. In yet another example, the duty cycle can be reduced to a low level (e.g., some nominal on-time), and kept low until the temperature, as measured by the heat detection circuit, falls below the threshold value. Once the temperature is detected as falling below the threshold, the duty cycle can be increased (the on-time lengthened) until the value of the duty matches the dim value set by the user.

Further, as a safety measure, the controller U2 can be programmed to quickly reduce the duty cycle, when the heat exceeds the threshold, but increase the duty cycle more slowly when the heat is detected as falling beneath the threshold. Thus, when the heat is detected as exceeding the threshold, the duty cycle can be reduced (i.e., the on-time shortened) by a predetermined value tailored to quickly lower the consumed by the load. As described above, this value can be determined according to a look up table or can be single predetermined value that is applied (once or each time the temperature is measured as exceeding the threshold). Once the temperature is detected as falling below the threshold, the duty cycle can be increased (the on-time lengthened) by a predetermined value that is less than the predetermined value by which the duty cycle was previously reduced. In other words, the duty cycle can be quickly reduced but slowly increased once the temperature values are lowered.

In the example of FIG. 4, the heat detection circuit is comprised of a diode D5 and pull up resistor R20 (connected to VCC), which are connected in series. The output of heat detection circuit is the voltage measured at the anode of diode D5. Diode D5 and resistor R20 can thus be conceived as a variation of a voltage divider circuit, with diode D5 standing in place of the second resistor. As the temperature increases, the forward voltage of the diode will reduce by, approximately, 2 mV per degree of temperature increase. The voltage across diode D5 thus approximates the temperature of the diode. By placing diode D5 near the bridge rectifier (i.e., near enough that the primary influencer of diode D5's temperature is bridge rectifier), controller U2 can adapt the duty cycle according to temperature of the bridge rectifier. It should be understood that other, or additional, suitable types of thermally sensitive components, such as thermistors, can be used in place of diode D5. (Thermally sensitive, here, referring to components which exhibit measurable change in voltage or current, corresponding to the temperature of the component.) A diode is selected because it is relatively inexpensive and can reliably detect voltage with enough granularity to be used in this context.

While FIGS. 1-4 are described in conjunction with a dimmer, it should be understood that such circuits can be used in any application requiring a variable output, including, for example, USB applications. In that sense, such circuits can be considered power control devices and are referred to as dimmers when the load is a lighting device.

Figure 5:
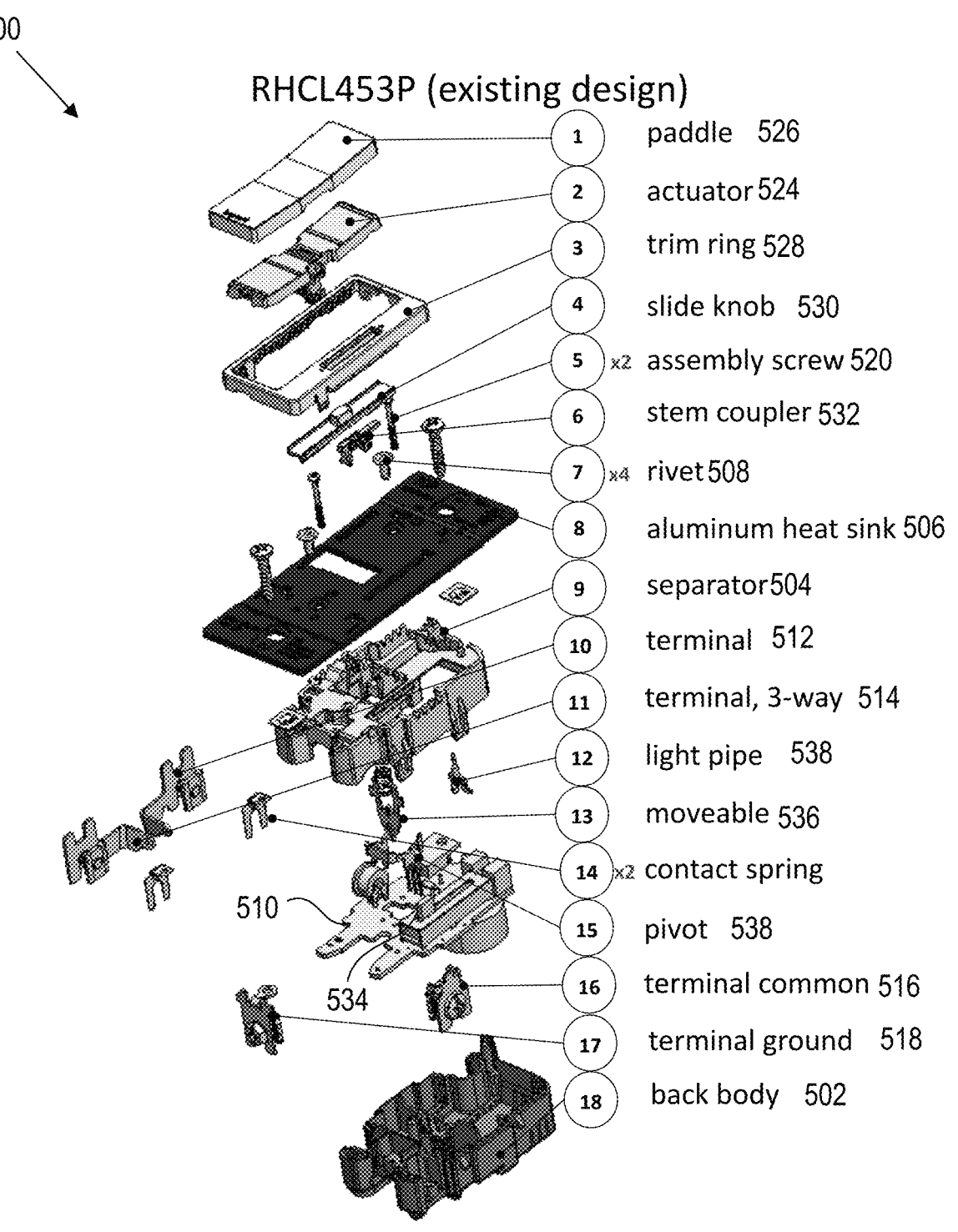
FIG. 5 depicts an exploded view of a dimmer device, according to an example.

FIG. 5 depicts an exploded view of an example prior art electrical wiring device 500; specifically, the RHCL453P Radiant® CFL/LED Dimmer sold by Pass & Seymour®. In this example, electrical wiring device includes a back body 502 and a separator 504. Separator 504 is connected to aluminum heat sink 506 via rivets 508 and assembly screws 520 and to back body 502 via a snap fit connection. Back body 502 and separator 504 together define a chamber that houses dimmer assembly 510. A printed circuit board (not shown) implementing a power control circuit, such as described in connection with FIGS. 1-4 can likewise be housed within the chamber defined by back body 502 and separator 504. The power control circuit can be electrically connected to the terminals of the electrical wiring device, shown here as terminal 512, terminal 514, common terminal 516, and ground terminal 518, such that the load control circuit provides variable power to a load connected across the terminal 512 or terminal 514 and common terminal 516.

Electrical wiring device 500 further includes an actuator assembly 522 including an actuator, which is covered by paddle 526. Actuator assembly 522 is included in the opening of a trim ring 528. Slide knob 530 is further included in a slot defined within trim 528. Stem coupler 532 extends from slide knob 530 to engage with interface slide 534, which is coupled to a potentiometer for measuring the state of the slide knob 526 and setting the dim level (or power level, otherwise) accordingly. Actuator 524 is coupled to moveable member 536, which is seated in pivot 538 such that it rocks side-to-side according to the action of actuator 524. Movable member 536 in this manner forms a double-sided contact that makes electrical contact with terminal 512 or terminal 514 according to the position of actuator 524.

Electrical wiring device 500 further includes a light pipe 538 to transmit light emitted by an LED (or other light source) to the actuator assembly 522. In other words, the light pipe 538 is in optical communication with the LED such that the light emitted by the LED is directed through the light pipe 538 and out of an aperture in the actuator assembly for indication or location purposes. It should be understood that the electrical wiring device of FIG. 5 is provided as an example dimmer to demonstrate various cost saving features of the electrical wiring device described in FIG. 6.

Figure 6:
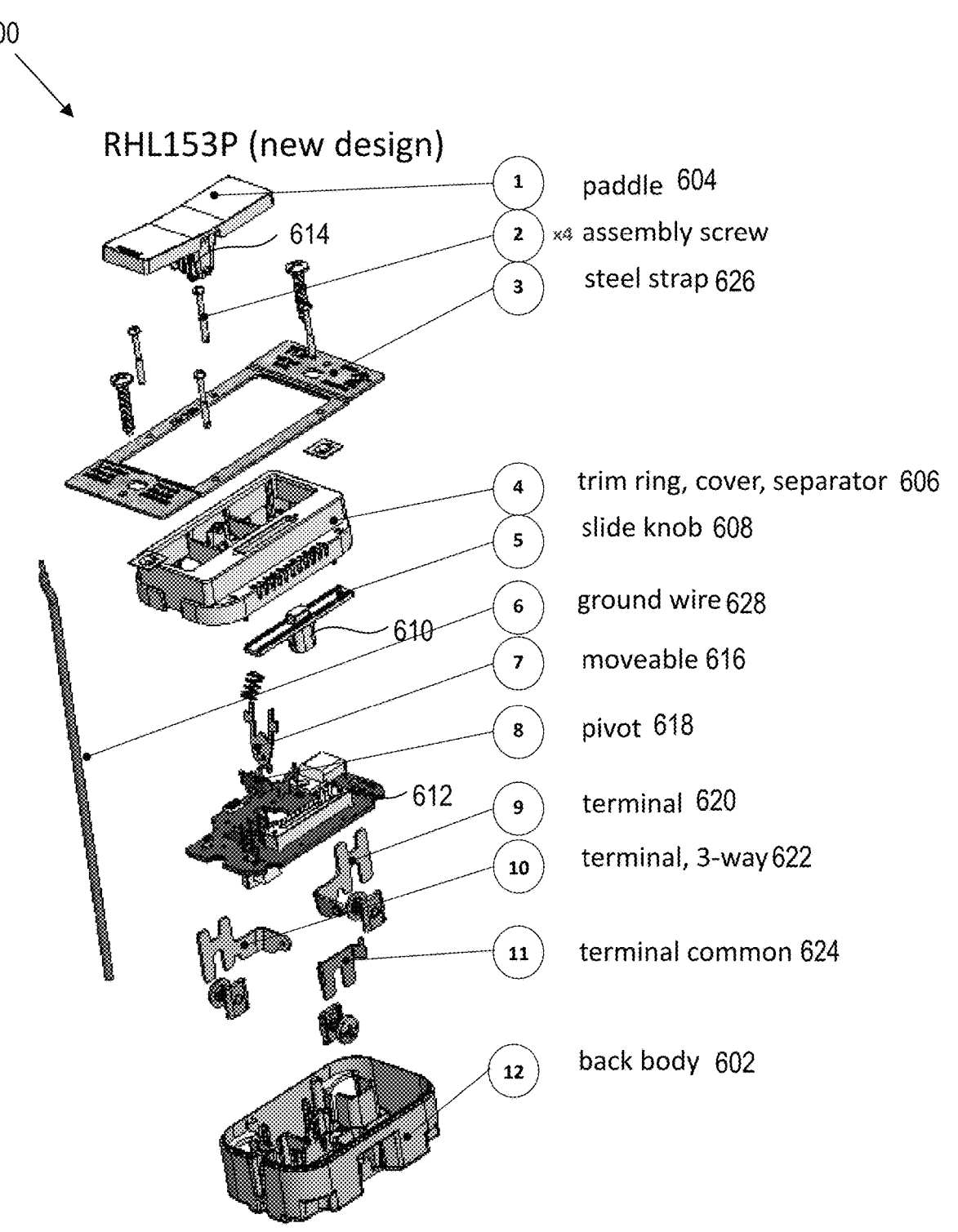
FIG. 6 depicts an exploded view of a dimmer device, according to an example.

FIG. 6 depicts an exploded view of an example electrical wiring device 600 including various cost saving features. Like the electrical wiring device of FIG. 5, the electrical wiring device 600 includes a back body 602. A power control circuit can be disposed in a cavity created trim ring separator 606 and back body 602. In this example, the paddle and actuator, slide knob and stem coupler, and trim-ring and separator have been respectively combined into single units. Thus, the paddle 604 is received into the opening of trim ring separator 606 (thus rendering a separate separator unnecessary). Trim ring separator 606 also receives slide knob 608, in a slide knob slot. The slide knob includes an extension 610 that engages with interface slide 612 (thus rendering a stem coupler redundant). Paddle 604 similarly includes an extension 614 that engages with movable member 616 that pivots about pivot point 618 to contact one of terminal 620 and terminal 622, to apply a variable voltage to a load connected across terminal 620,622 and terminal common 624.

Further, the use of a steel strap 626 instead of an aluminum heat sink permits the ground wire to be welded directly to the strap. The absence of the heat sink extending through the center of the device permits the combination of the trim-ring and separator into a single unit, trim ring separator 606. Additionally, removing various aspects such as the indicator light permits the reduction of components such as contact springs, two rivets, LED, light pipe, and several board components.

Figure 7A:
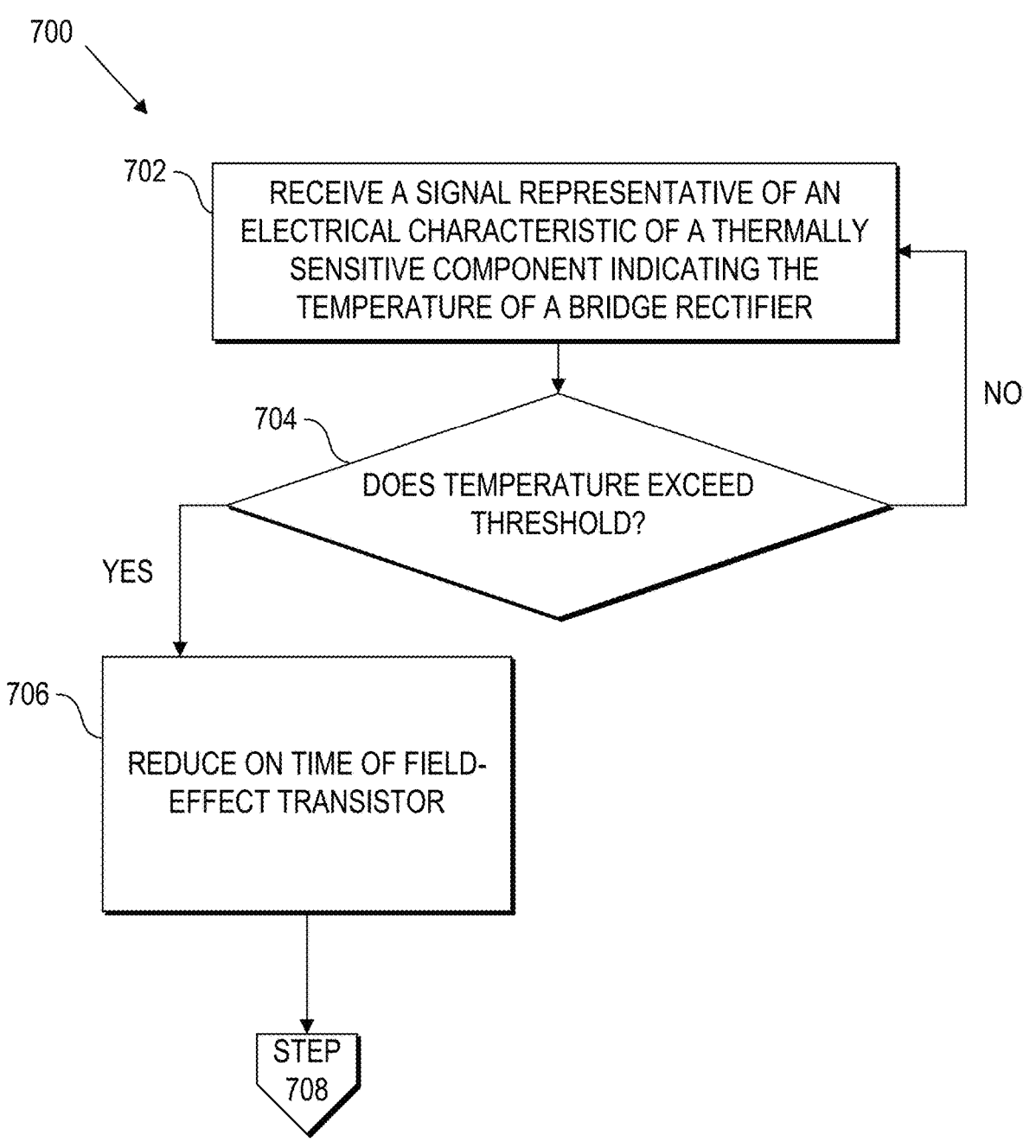
FIGS. 7A-7B depict a flowchart of a method of temperature compensation of an electrical wiring device, according to an example.
Figure 7B:
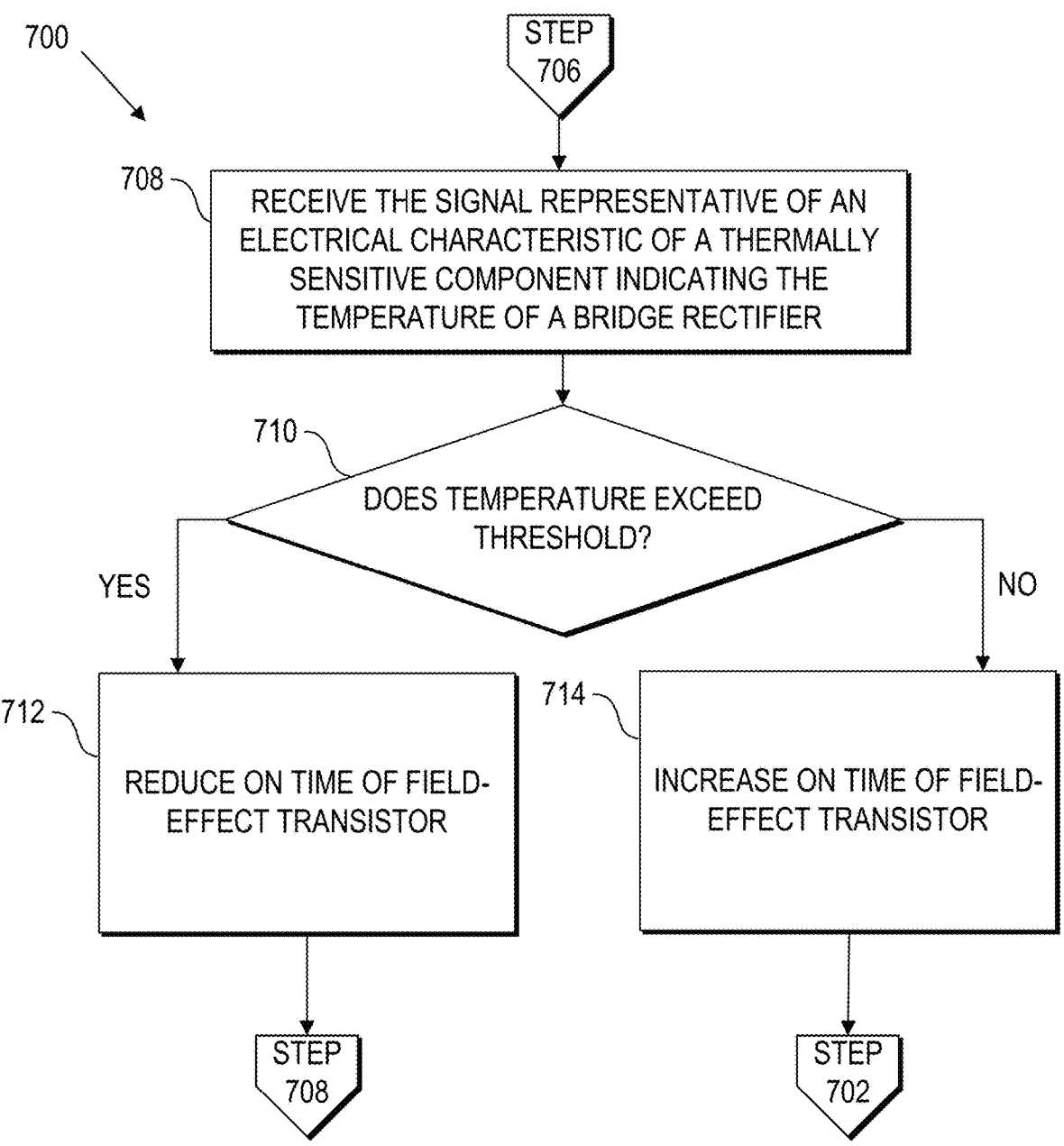

FIGS. 7A-7B depicts a method 700 for temperature compensation of an electrical wiring device that provides a variable power to a load, and, particularly, for temperature compensation of a bridge rectifier used in conjunction with a MOSFET to provide the variable power. The method of FIG. 7 can be accomplished by a controller, such as controller U2, which can comprise at least one non-transitory storing program code for executing the steps of method 700.

In an example, the controller can comprise one or more microcontrollers and any associated hardware necessary for operation.

At step 702, a signal representative of an electrical characteristic (such as a current or voltage) of a thermally sensitive component is received. The signal representative of the electrical characteristic, can itself be the current through the thermally sensitive component or the voltage across it, or can be another signal representative of the electrical characteristic (e.g., the voltage across the thermally sensitive component, amplified by an amplifier).

At step 704, the controller determines whether the temperature of the bridge rectifier exceeds a threshold, by comparing the signal to a threshold. Because the signal is a proxy for temperature of the bridge rectifier, comparison of the signal to a threshold is a comparison of the temperature of the bridge rectifier to a threshold.

Upon determining the temperature does not exceed the threshold, the method returns to step 702 to restart the method. However, upon determining the temperature does exceed the threshold, the on-time of the field-effect transistor (i.e., the duty cycle) is reduced (i.e., from the user-selected on time) to effect a temperature reduction of the bridge rectifier. In an example, the signal can be input to a look-up table, implemented by controller U2, equating voltage values (representative of temperature) to duty cycle values. Alternatively, the duty cycle can be reduced by a predetermined value. In yet another example, the duty cycle can be reduced to a low level and kept low until the temperature, as measured by the heat detection circuit, falls below the threshold value (e.g., at step 710, discussed below).

Following step 706, the method can proceed to step 708, depicted in FIG. 7B. Steps 708-714 in FIG. 7B represents the steps of method 700 once the on-time of the FET has been reduced, i.e., the controller is in a temperature compensation state. Steps 708 and 710 repeat the steps of 702 and 704 for a newer sample. Thus, upon determining, at step 710, the temperature continues to exceed the threshold, the on-time of the field effect transistor can be further reduced at 712. The value of the on-time, like at step 706, can be determined according to the look up table or can be reduced by a predetermined value. Alternatively, if, at step 706, the on-time is reduced to a low value, the on-time can be held at this value at step 712 to allow temperature to reduce for another sample. After step 712, the method can return to step 708 to receive another sample of the signal representative of the electrical characteristic of the thermally sensitive component.

Upon determining, however, that the temperature has does not exceed the threshold, then at step 714 the on-time of the field-effect transistor can be increased. The increase can be determined according to a look up table, which can be the same table used to decrease the temperature values at steps 706, 712 or a different look up table. Alternatively, the on-time of the field-effect transistor can be increased by a predetermined value. The predetermined value can be the same as the value at which the on-time was reduced at steps 706, 712, or, in certain examples, the predetermined value can be less than or greater than the value the on-time was reduced at steps 706, 712. For example, the predetermined value can be less than the value at which the on-time was reduced in order to ensure that the temperature does not quickly exceed the threshold again.

If, at step 706 or 712, the on-time had been reduced to a low value, the on-time can be returned to the user-selected on-time (i.e., according to the user interface) or to an intermediate value. Following step 714, the method can return to step 702. However, if the on-time, following step 714 still has not returned to the user-selected on time, the method can alternatively move to step 708 or otherwise follow a predetermined routine to increase the on-time over a period of time until it reaches the user-selected on time.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed.

All references, including publications, patent applications, and patents, cited herein are hereby incorporated by reference to the same extent as if each reference were individually and specifically indicated to be incorporated by reference and were set forth in its entirety herein.

All definitions, as defined and used herein, should be understood to control over dictionary definitions, definitions in documents incorporated by reference, and/or ordinary meanings of the defined terms.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A dimmer device with temperature compensation, comprising:
   a housing assembly including a line terminal configured to be attached to a mains input, and a load terminal configured to be attached to a load;
   a bridge rectifier, including a first input terminal and a second input terminal and a first output terminal and a second output terminal, wherein the first input terminal is electrically connected to the line terminal and the second input terminal is electrically connected to the load terminal;
   a field-effect transistor having a body diode, the field-effect transistor being connected between the first output terminal and the second output terminal such that the body diode blocks current between the first output terminal and the second output terminal except for when a sufficient voltage is applied to a gate of the field-effect transistor, wherein blocking current between the first output terminal and the second output terminal interrupts current to the load terminal;
   a thermally sensitive component disposed such that an electrical characteristic of the thermally sensitive component is representative of a temperature of the bridge rectifier;
   at least one variable control mechanism coupled to the housing assembly, the at least one variable control mechanism being configured to adjustably select a user adjustable load setting, the user adjustable load setting being adjustable between a minimum setting and a maximum setting; and
   a controller configured to apply a voltage to the gate of the field-effect transistor such that the field-effect transistor is on for an on-time occurring during at least a portion of each half cycle of the mains input, wherein the controller is configured to adjust the on-time of the field-effect transistor based, at least in part, on the user adjustable load setting, wherein the controller is further configured to reduce the on-time of the field-effect transistor when the electrical characteristic of the thermally sensitive component indicates that the temperature of the bridge rectifier exceeds a threshold.

2. The dimmer device of claim 1, wherein the thermally sensitive component is a diode.

3. The dimmer device of claim 1, wherein the thermally sensitive component is a thermistor.

4. The dimmer device of claim 1, wherein the on-time of the field-effect transistor is reduced according to a look up table that correlates a value of the electrical characteristic of the thermally sensitive component to an on-time of the field-effect transistor.

5. The dimmer device of claim 1, wherein the on-time of the field-effect transistor is further reduced each instance the electrical characteristics of the thermally sensitive component indicates that the temperature of the bridge rectifier exceeds the threshold.

6. The dimmer device of claim 1, wherein, after reducing the on-time when the electrical characteristic of the thermally sensitive component indicates that the temperature of the bridge rectifier exceeds the threshold, the on-time can be increased upon determining that the electrical characteristic of the thermally sensitive component indicates that the temperature of the bridge rectifier does not exceed the threshold.

7. A dimmer device with temperature compensation, comprising:
   a housing assembly including a line terminal configured to be attached to a mains input, and a load terminal configured to be attached to a load;
   a thermally sensitive component disposed within the housing assembly;
   a controller configured to permit conduction of current from the line terminal to the load terminal for a portion of each half cycle of the mains input, wherein the controller is configured to adjust the length of the portion of each half cycle based, at least in part, on a user input, wherein the controller is further configured to reduce length of the portion of each half cycle based on when an electrical characteristic of the thermally sensitive component indicates that a temperature exceeds a threshold.

8. The dimmer device of claim 7, wherein the thermally sensitive component is a diode.

9. The dimmer device of claim 7, wherein the thermally sensitive component is a thermistor.

10. The dimmer device of claim 7, wherein the portion of each half cycle is reduced according to a look up table that correlates a value of the electrical characteristic of the thermally sensitive component to the length of the portion of each half cycle.

11. The dimmer device of claim 7, wherein the length of the portion of each half cycle is further reduced each instance the electrical characteristics of the thermally sensitive component indicates that the temperature exceeds the threshold.

12. The dimmer device of claim 7, wherein, after reducing the length of the portion of each half cycle when the electrical characteristic of the thermally sensitive component indicates that the temperature exceeds the threshold, the length of the portion of each half cycle can be increased upon determining that the electrical characteristic of the thermally sensitive component indicates that the temperature does not exceed the threshold.

13. The dimmer of claim 12, wherein the length of the portion of each half cycle is reduced at a first rate, wherein the length of the portion of each half cycle is increased at a second rate, wherein the first rate is higher than the second rate.

14. A dimmer device with temperature compensation, comprising:

a housing assembly including a line terminal configured to be attached to a mains input, and a load terminal configured to be attached to a load;

a bridge rectifier connected between the line terminal and the load terminal such that current conducted between the line terminal and load terminal passes through the bridge rectifier;

a thermally sensitive component disposed within the housing assembly, an electrical characteristic of the thermally sensitive component is representative of a temperature of the bridge rectifier;

a controller configured to permit conduction of current from the line terminal to the load terminal for a portion of each half cycle of the mains input, wherein the controller is configured to adjust the length of the portion of each half cycle based, at least in part, on a user input, wherein the controller is further configured to reduce length of the portion of each half cycle based on when the electrical characteristic of the thermally sensitive component indicates that the temperature of the bridge rectifier exceeds a threshold.

15. The dimmer device of claim 14, wherein the thermally sensitive component is a diode.

16. The dimmer device of claim 14, wherein the thermally sensitive component is a thermistor.

17. The dimmer device of claim 14, wherein the portion of each half cycle is reduced according to a look up table that correlates a value of the electrical characteristic of the thermally sensitive component to the length of the portion of each half cycle.

18. The dimmer device of claim 14, wherein the length of the portion of each half cycle is further reduced each instance the electrical characteristics of the thermally sensitive component indicates that the temperature of exceeds the threshold.

19. The dimmer device of claim 14, wherein, after reducing the length of the portion of each half cycle when the electrical characteristic of the thermally sensitive component indicates that the temperature of the bridge rectifier exceeds the threshold, the length of the portion of each half cycle can be increased upon determining that the electrical characteristic of the thermally sensitive component indicates that the temperature does not exceed the threshold.

20. The dimmer of claim 19, wherein the length of the portion of each half cycle is reduced at a first rate, wherein the length of the portion of each half cycle is increased at a second rate, wherein the first rate is higher than the second rate.

* * * * *